Patented Aug. 28, 1934

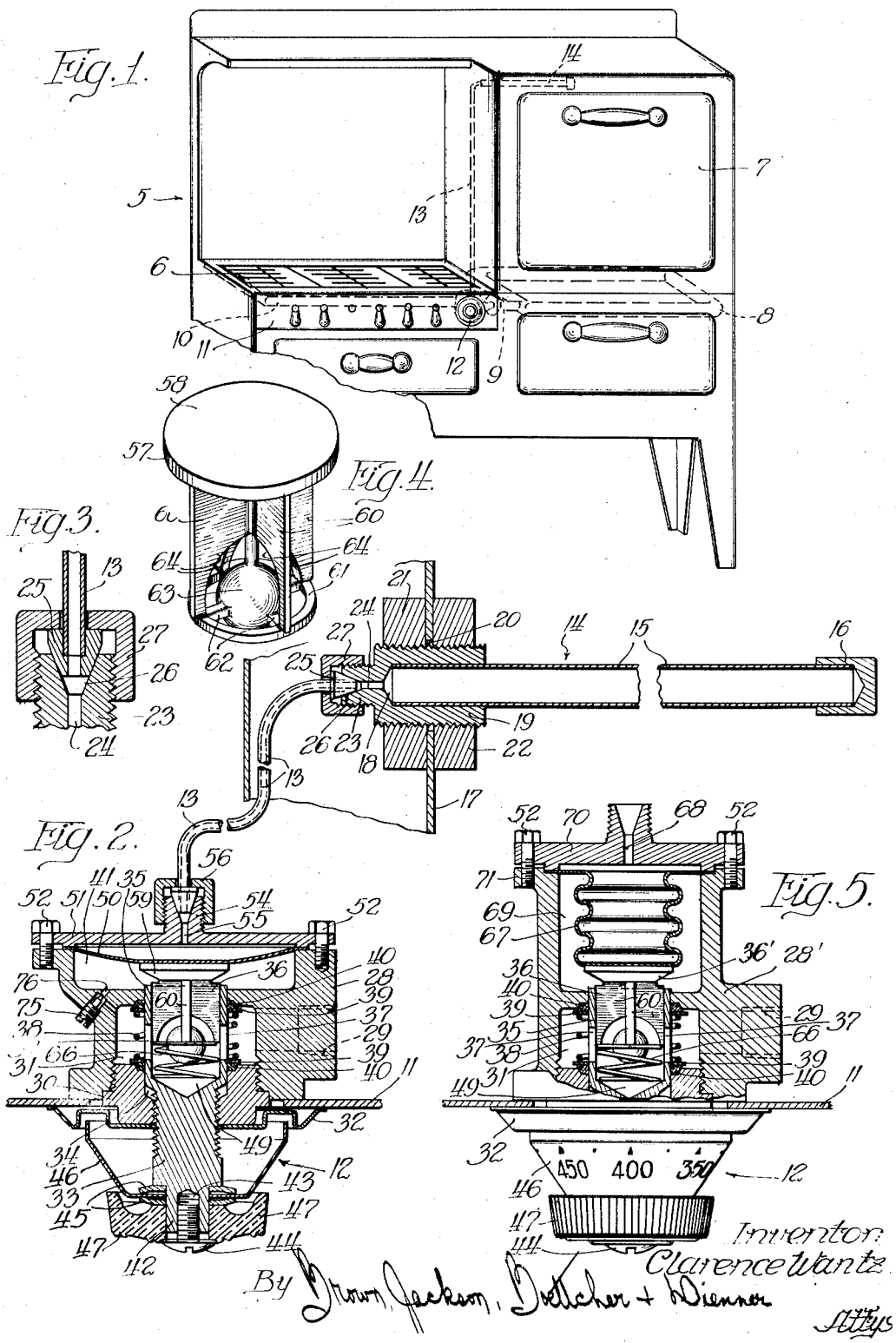

1,971,801

UNITED STATES PATENT OFFICE 1,971,801

OVEN HEAT CONTROL

Clarence Wantz, Milwaukee, Wis., assignor to Milwaukee Gas Specialty Company, Milwaukee, Wis., a corporation of Wisconsin Application March 18, 1932, Serial No. 599,639

11 Claims. (Cl. 236—15)

This invention relates to heat controls, and more particularly to oven heat controls provided for the purpose of maintaining within an oven or a similar heated compartment, a desired predetermined temperature.

In the preferred form of the present invention, I provide a heat control including a fluid, which, in changing its volume due to temperature changes, will control the flow of gas to an oven burner and thereby control the temperature within the oven.

The control comprises, in its essential details, a temperature selecting mechanism, a valve for controlling the flow of gas to the oven burners, and a thermally sensitive element responsive to the temperature existing within the oven.

The particular thermally responsive element in the instant invention comprises a tube containing a fluid, preferably a gas such as air, or the like, which expands and contracts in response to temperature changes within the oven. In prior types of oven heat controls, the thermally responsive elements usually have been of the rod and tube, or of the bimetallic type. The present invention, by the use of a fluid, such as a gas, provides a sensitive and quick acting medium for transmitting temperature changes to a valve. Gas, or other fluids, have a substantially instantaneous response to temperature changes.

This expansion and contraction is transmitted through a suitable pressure line to a valve controlling the supply of gas from the gas manifold to the oven burner, thus directly influencing the heat within the oven. For example, if the temperature within the oven is above the desired preselected value, the fluid within the thermally responsive element will expand, thus increasing the pressure upon the valve and tending to force the valve to seat. This reduces the quantity of fuel passing through the valve to the oven burner, therefore lowering the temperature within the oven. If the temperature within the oven is lower than the desired preselected value, the fluid within the thermally responsive element will contract, reducing the pressure upon the valve and thus increasing the quantity of fuel supplied to the oven burner. The thermally responsive element therefore controls the position of the valve for regulating the supply of fuel to maintain the desired preselected temperature within the oven.

Other features and advantages of the instant invention will appear more fully from the following detailed description, which, taken in connection with the accompanying drawing, will disclose to those skilled in the art the particular construction and operation of a preferred form of my novel heat control.

In the drawing:

Figure 1 is a partial perspective view of a domestic gas range or the like, showing the manner of installing my heat control therein;

Figure 2 is an elevational sectional view showing the selecting mechanism, valve, and the thermally responsive element;

Figure 3 is a detail view of one of the pressure line connections;

Figure 4 is a detail view of the valve plunger for controlling the flow of gas; and Figure 5 is a sectional elevational view showing a modification.

Referring now in more detail to the drawing, I have indicated, in Figure 1, an ordinary type of oven range, such as the gas range 5, which is provided with the open top or grate burners 6 and the oven chamber 7.

Disposed within the oven 7 is the usual oven burner indicated in dotted lines at 8. This burner is connected, by means of the usual mixing tube 9, and conduit connection with the gas supply manifold indicated at 10. This gas supply manifold extends along the front of the control panel 11 of the gas range, and serves to supply fuel for both the open top burners 6 and the oven burner 8.

A suitable selecting knob, indicated at 12, is provided for the purpose of preselecting the temperature desired within the oven. Extending upwardly through the oven wall is a tube or conduit 13, which leads to the thermally responsive element 14 disposed within the oven.

Referring now in more detail to Figure 2, which illustrates a sectional view of the selecting mechanism and the thermally responsive element associated therewith, this element 14 comprises the tube member 15 and the end closure cap member 16. The tube 15 is adapted to extend from the oven wall 17 inwardly into the oven chamber, and is directly responsive to temperatures existing within the oven. The outer end of the tube is secured in a suitable recess 18 formed in a threaded sleeve member 19. This member 19 is disposed in a suitable aperture 20 formed in the oven wall by means of the two locking members 21 and 22 which are threaded upon the member 19 upon opposite sides of the oven wall. The member 19 is provided with a projecting threaded boss member 23, which is provided with the longitudinal channel 24. This channel 24 leads from the interior of the tube 15 to the conduit 13.

Suitable sealing means are provided for sealing the joint or connection between the conduit 13 and the channel 24, comprising, as shown in detail in Figure 3, a frusto-conical member 25, which seats upon the outwardly flared portion 26 of the channel 24. The tube 13 is suitably secured in gas-tight relation with the member 25, and the member 25 is forced inwardly upon the flared portion 26 by means of a cap 27, which threads upon the boss 23 and bears inwardly upon the member 25 to force it into tight engagement with the seat 26 of the channel 24. This provides a gas-tight connection between the interior of the tube and the conduit 13.

The conduit 13 leads from the thermally responsive element 14 down between the inner and outer oven walls and to the selecting mechanism indicated at 12. This selecting mechanism comprises a pressure responsive valve associated with a selecting dial. The valve comprises the valve body 28, which is provided with the gas outlet 29. The valve housing or body 28 is secured to the inner surface of the panel 11 mounted at the front of the range, and containing the gas cock and associated apparatus for controlling the flow of fuel to the various burners. A nut, or bushing 30, is provided for sealing the outlet chamber 31 of the valve, and is adapted to form a seat for the bezel member 32 mounted upon the outer surface of the panel wall 11. A suitable control spindle 33 extends through the nut 30 and is threaded therethrough. The nut 30 has a recessed portion 34 which is adapted to receive the enlarged cylindrical portion 35 of the control spindle 33. This cylindrical portion 35 extends inwardly through the valve body, and is hollowed out to receive the valve member, indicated generally by the numeral 36. The inner end of the cylindrical portion 35 is machined to provide a seat for the valve member 36. This cylindrical portion also has the ports 37 formed therein for the purpose of permitting fuel to flow past the valve member 36 and outwardly through the ports 37 to the valve outlet 29.

Surrounding the cylindrical portion 35 of the spindle 33 is a coiled spring member 38, which has each of its ends biased against annular washers 39 positioned about the cylindrical portion 35, and bearing against suitable packing 40 disposed in recesses formed in the retaining nut 30 and the valve body 28. This is for the purpose of preventing the escape of gas along the outer surface of the cylindrical portion 35 of the spindle 33 from the inlet chamber 41 to the outlet chamber or from the outlet chamber to the recess 34 and outwardly past the spindle member 33.

The spindle member 33 is provided at its outer projecting end with a reduced portion 42, which is internally recessed as at 43 for receiving the adjusting screw 44. A pair of annular washers 45 serve to secure the dial member 46 in frictional engagement with the control spindle 33, so that it will rotate therewith. A suitable control knob, having its outer surface knurled, and indicated at 47, fits around the projecting portion 42 of the spindle 33, and is rigidly held in position by the screw 44. It is to be noted that the screw may be loosened to effect the release of the frictional engagement between the washers 45 and the dial 46, and to permit rotation of the dial about the spindle 33, this being utilized for the purpose of properly positioning the dial with respect to the setting of the control spindle. The screw 44 is then tightened to clamp the dial 46 firmly between the washers 45, and secure it in non-rotatable engagement with the spindle 33.

Disposed within the recess 49 provided in the extending cylindrical portion 35 of the spindle is the valve member 36, which has the configuration shown more in detail in Figure 4. This valve member 36 is suitably secured to a diaphragm 50 which has its outer periphery clamped between the cap member 51 and the peripherally flanged portion of the valve housing 28 by means of the cap screws 52. Suitable packing may be provided to prevent the escape of gas out past this engaging portion. The cap member 51 is provided with a projecting threaded boss member 54 having the channel 55 formed therein. A suitable cap nut 56, corresponding to the cap nut 27, is provided for the purpose of maintaining a gas-tight connection between the conduit 13 and the cap member 51.

A suitable metering screw 75 may be provided for adjusting or controlling the effective area of a by-pass 76. This by-pass insures that a gas supply sufficient to maintain a flame at the oven burner will be provided, whenever the gas cock controlling flow of fuel from the manifold to the valve is opened, even though the selecting means is in closed position.

Referring now in more detail to the valve member 36, which is particularly disclosed in Figure 4, this member comprises the cylindrical portion 57, which has its surface 58 suitably secured, as by welding or the like, to the diaphragm member 50. Depending outwardly from this cylindrical portion 57 is a frusto-conical section, indicated by the numeral 59 which serves as a seat for engaging with the peripheral edge of the cylindrical portion 35 of the spindle 33 to restrict or control the flow of fuel from the inlet chamber 41 to the outlet 29. Depending downwardly from the frusto-conical valve seat 59 are a plurality of fins or guide members 60, which are adapted to engage the inner surface of the cylindrical portion 35 of the spindle 33, for guiding the valve member 36 upwardly and downwardly in the recess 49.

A ring member 61 is provided at the bottom of the guide fins 60, and suitable inner connecting reinforcing stems 62 extend from the lower portion of the fins and the ring member to a centrally located ball member 63, forming a rigid structure. The fins 60 are provided adjacent their lower edges with arcuate or cut out portions indicated at 64, for permitting gas to pass downwardly between the guides 60 and past the ball member 63 into the outlet chamber 31 of the valve housing.

A suitable spring 66 is disposed in the recess 49 below the ring member 61 of the valve 36, and serves to bias the valve within the recess.

Referring now in more detail to the embodiment disclosed in Figure 5, this embodiment is similar to that disclosed in Figure 2 except that the valve 36' is secured to the outer surface of an enclosed bellows 67, the bellows 67 having communication through the channel 68 with the conduit 13 leading to the thermally sensitive element. The bellows 67 may be of any suitable metallic form, and is capable of expanding and contracting in response to pressure changes within the bellows. The valve housing 28' in this embodiment has the elongated recessed portion 69 for accommodating the bellows 67, and is provided adjacent its upper surface with a cap member 70 adapted to be secured on to the peripheral flanged portion 71 of the housing 28' to secure the bellows in position within the recess 69, and to provide the communication between the conduit 13 and the interior of the bellows.

The selecting mechanism in this embodiment is similar to that disclosed in Figure 2 and comprises the control knob 47, the dial member 46 carrying suitable temperature markings corresponding to the temperature desired within the oven, the mounting bezel 32, and the valve spindle with its extending cylindical portion 35. It is to be noted, in connection with the installation of this heat control, that all of the operating parts except the control dial and associated control knob are disposed within the wall and heating compartment of the gas range, therefore providing a very neat and pleasing appearance and leaving the exterior of the oven without valves or other protruding mechanisms.

In operation, the gas cock controlling the flow of fuel from the gas supply manifold through the valve and selecting mechanism 12 to the oven burner 8 is first opened, and the oven burner is ignited, by means of a pilot light or other suitable igniting means. The selecting mechanism is rotated to position the portion 35 thereof in the proper position with respect to the valve 36 so that a definitely controlled proportion of gas passes to the mixing chamber 9 and thence to the oven burner. Upon increase of temperature within the oven, the gas, or other fluid, expands within the tube 15. Therefore the dial markings can be so calibrated with respect to the rotation of the spindle 33, that the setting of the valve will be such that this expansion due to the increase in temperature from room temperature to the desired oven temperature will be compensated for by the time that the oven assumes the desired temperature. After the preselected temperature has been established in the oven any variation therefrom will result in a corresponding variation in the valve setting, thus positively controlling the quantity of fuel admitted to the burner 8, and consequently controlling and maintaining the temperature within the oven at the desired point.

Thus, if the temperature within the oven increases above the desired preselected temperature, the gas or fluid within the tube 15 will expand, and this expansion will result in an increased pressure being transmitted through the conduit or tubing 13 to the diaphragm member 50. This results in flexing of the diaphragm member, forcing the portion 50 thereof down toward or into contact with the peripheral edge of the portion 35 of the spindle 33. The amount the diaphragm is flexed will determine the quantity of fuel passing from the inlet chamber 41 to outlet chamber 31. Therefore, as the gas expands in the tube 15, the pressure will cause the valve to tend to close, and will diminish this fuel supply, thus reducing the temperature within the oven.

However, if the temperature within the oven does not reach that which is desired, the contraction of the gas within the tube 15 will cause a reduction of pressure upon the diaphragm 50, and will result in the diaphragm being flexed upwardly by the spring 56. This will increase the quantity of fuel passing through the valve, and will thus increase the temperature within the oven.

Thus it is apparent that the thermally responsive element 14 will positively maintain the temperature within the oven at the desired predetermined value, and will function to so regulate the valve 36 as to control the supply of fuel to the oven burner 8.

In the embodiment of Figure 5, it is to be understood that the bellows and connected conduit and oven tube are fluid filled as in the preceding embodiment. In this case the pressure within the bellows 67 will cause the bellows to contract upwardly, or to expand downwardly, and will thus actuate the valve 36' in the same manner as the valve 36 of Figure 2 is actuated.

While I have shown the thermally sensitive element as being of a tube type, it is apparent that this might be a hemispherical member or any other member having a hollow interior space adapted to be subjected to the temperature within the oven, whereby the fluid, or gas within the space is expanded or contracted in accordance with temperature changes, and is so connected as to actuate the valve controlling the supply of fuel to the oven burner. The conduit 13 is preferably of a metallic tubing, such as copper tubing, and may be bent to conform to any desired path, and therefore can be led down between the outer oven wall and the inner oven liner wall and thus be entirely unexposed until it reaches the selecting mechanism.

I do not intend to be limited to the exact details shown and described in connection with the embodiments of the invention disclosed in the accompanying drawing, but only insofar as defined by the scope and spirit of the appended claims.

I claim:

1. In an oven, an oven heat control comprising a selecting mechanism having a rotatable spindle having a tubular portion, the peripheral edge thereof serving as a valve seat, a valve adapted to engage said valve seat and having extending guide means engaging the inner surface of said tubular portion, and thermally responsive pressure means within said oven for varying the position of said valve.

2. In an oven, an oven heat control comprising a selecting mechanism including a spindle, said spindle having a projecting portion the peripheral edge of which forms a valve seat, a valve for said seat having integral guide means registering with and slidable in said projecting portion, and means secured to said valve and responsive to pressure changes caused by variations of temperature within said oven to vary the position of said valve.

3. In combination, an oven, selecting means for predetermining the temperature desired within said oven, said selecting means having an extending tubular portion, a valve carried by said selecting means and having guide means slidingly engaging the inner surface of said tubular portion, said valve having seating engagement with the peripheral edge at the end of said portion, and fluid pressure means disposed within said oven and responsive to temperature changes therein for actuating said valve toward or away from said portion of said selecting means to maintain the preselected temperature within said oven.

4. In a device of the class described, selecting means including a control knob and an associated spindle, said spindle having an enlarged cylindrical portion provided with outlet ports, a valve member having integral guide members extending into said cylindrical portion and having a valve seating portion adapted to engage the peripheral edge of said cylindrical portion, and pressure means for varying the position of said valve member.

5. In a device of the class described, a housing, a valve resiliently secured in said housing, selecting means including a spindle having a projecting recessed portion provided with a circular peripheral edge forming a seat for said valve member, space slotted guide members carried by said valve and engaging the inner wall of said recessed portion, said recessed portion having outlet ports, and pressure means for varying the position of said valve.

6. In a device of the class described, a valve member comprising an upper surface engaging pressure responsive means, a valve seating portion, a plurality of guide members depending from said seating portion for alining the valve with the valve seat, and a reinforcing ring member secured at the lower end of said guide members.

7. In a device of the class described, a valve housing, a valve having projecting guide members, a spindle threading into said housing and having an enlarged tubular portion for receiving the guide members of said valve, said spindle being provided with ports leading to the interior of said tubular portion, and said spindle providing a seat for said valve along the peripheral margin of said tubular portion.

8. In a control of the class described, a valve comprising a valve seating portion, guide means comprising a plurality of radially extending fin members depending from said seating portion, and a reinforcing ring member engaging the lower end of said fin members, said fin members having cut away portions providing for communication through said fin members.

9. In combination, selecting means including a rotatable spindle having a recessed end, port means formed in said recess, a valve member adapted to close the end of said recess, said valve member having radially extending fin members engaging the inner surface of said recess for guiding the valve member during movement thereof, and thermally controlled means for varying the position of said valve member with respect to the end of said recess.

10. In combination, in a heat control device, control means comprising a valve housing having inlet and outlet chambers, a selecting spindle threading into said housing and having its inner extending portion recessed to provide communication between said chambers, a dial member carried on the outer end of said spindle, means for adjusting said dial member relative to said spindle, a valve member disposed in said inlet chamber and adapted to close the recessed end of said spindle, said member having depending guiding fins extending into and engaging the inner periphery of said recess, and thermally sensitive means for varying the position of said valve member.

11. In combination, in a heat control device, control means comprising a valve housing having inlet and outlet chambers, a pressure responsive diaphragm secured between said chambers, a selecting spindle threading into said housing and having its inner extending portion recessed to provide communication between said chambers, a valve member secured to said diaphragm and having means extending into the recessed end of said spindle for guiding movement of the valve with respect thereto, said spindle having the peripheral edge of said recess formed to define a valve seat, said guiding means of said valve providing for passage of gas through said spindle from one chamber to the other.

CLARENCE WANTZ.